United States Patent
Suzuki

(10) Patent No.: US 8,727,375 B2
(45) Date of Patent: May 20, 2014

(54) SIDE AIR BAG DEVICE, OCCUPANT PROTECTION DEVICE AND OCCUPANT PROTECTION METHOD

(75) Inventor: Mototsugu Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/410,408

(22) Filed: Mar. 2, 2012

(65) Prior Publication Data
US 2012/0235388 A1    Sep. 20, 2012

(30) Foreign Application Priority Data

Mar. 17, 2011    (JP) .................................. 2011-059300

(51) Int. Cl.
B60R 21/231    (2011.01)
(52) U.S. Cl.
USPC ..................................... 280/730.2; 280/743.1
(58) Field of Classification Search
USPC ................................. 280/730.2, 743.1, 743.2
See application file for complete search history.

(56) References Cited

U.S. PATENT DOCUMENTS

| | | | | |
|---|---|---|---|---|
| 5,306,043 A | * | 4/1994 | Mihm et al. | 280/732 |
| 5,636,862 A | * | 6/1997 | Cheung et al. | 280/730.2 |
| 5,647,609 A | * | 7/1997 | Spencer et al. | 280/730.2 |
| 5,730,464 A | * | 3/1998 | Hill | 280/743.2 |
| 5,806,881 A | * | 9/1998 | Richter et al. | 280/730.2 |
| 6,378,896 B1 | * | 4/2002 | Sakakida et al. | 280/730.2 |
| 6,561,539 B1 | * | 5/2003 | Sunabashiri et al. | 280/730.1 |
| 7,108,278 B2 | * | 9/2006 | Kai et al. | 280/730.2 |
| 7,207,594 B2 | * | 4/2007 | Igawa et al. | 280/730.1 |
| 7,396,042 B2 | * | 7/2008 | Mabuchi et al. | 280/730.2 |
| 7,461,862 B2 | * | 12/2008 | Hasebe et al. | 280/743.2 |
| 7,475,904 B2 | * | 1/2009 | Hofmann et al. | 280/739 |
| 7,549,672 B2 | * | 6/2009 | Sato et al. | 280/730.2 |
| 7,669,887 B2 | * | 3/2010 | Svenbrant et al. | 280/730.2 |
| 7,712,766 B2 | * | 5/2010 | Gutmann et al. | 280/728.2 |
| 7,793,973 B2 | * | 9/2010 | Sato et al. | 280/730.2 |
| 7,828,322 B2 | * | 11/2010 | Breuninger et al. | 280/730.2 |
| 7,922,193 B2 | * | 4/2011 | Breuninger et al. | 280/730.2 |
| 7,938,440 B2 | * | 5/2011 | Kataoka et al. | 280/730.2 |
| 7,967,334 B2 | * | 6/2011 | Breuninger et al. | 280/743.1 |
| 8,186,708 B2 | * | 5/2012 | Zhou et al. | 280/730.2 |
| 8,220,830 B2 | * | 7/2012 | Takimoto et al. | 280/730.1 |
| 2005/0206138 A1 | * | 9/2005 | Breuninger et al. | 280/729 |
| 2006/0119083 A1 | * | 6/2006 | Peng et al. | 280/730.2 |
| 2006/0131847 A1 | * | 6/2006 | Sato et al. | 280/730.2 |
| 2006/0261579 A1 | * | 11/2006 | Breed | 280/729 |

FOREIGN PATENT DOCUMENTS

JP    2007-50847    3/2007
JP    2007050847 A    *    3/2007

* cited by examiner

*Primary Examiner* — Joseph M Rocca
*Assistant Examiner* — Timothy Wilhelm
(74) *Attorney, Agent, or Firm* — Smith, Gambrell & Russell, LLP.

(57) ABSTRACT

There are provided a side air bag device, an occupant protection device and an occupant protection method. The side air bag device that expands a side air bag member and a curtain air bag member between a side door and a passenger in a widthwise direction of a vehicle so as to protect the passenger from a shock caused by a side impact on the side door. The side air bag member is expanded such that a first chamber of the side air bag member directs toward a compartment in the widthwise direction of the vehicle.

20 Claims, 12 Drawing Sheets

SIDE AIR BAG DEVICE, OCCUPANT PROTECTION DEVICE AND OCCUPANT PROTECTION METHOD

CROSS-REFERENCE TO RELATED APPLICATIONS

The present application claims priority from Japanese Patent Application No. 2011-059300 filed on Mar. 17, 2011, the entire contents of which are hereby incorporated by reference.

BACKGROUND OF THE INVENTION

1. Field of the Invention

The present invention relates to a side air bag device, an occupant protection device and an occupant protection method for protecting a passenger from a shock caused by a side impact on a side wall of a vehicle (hereinafter merely referred to as a side impact) by expanding a side air bag member between a passenger on a vehicle seat and the side wall of the vehicle, and more particularly, to a side air bag device, an occupant protection device, and an occupant protection method capable of suppressing an interference with a head protective air bag member (hereinafter referred to as a curtain air bag member).

2. Description of Related Art

There has conventionally been known a side air bag device that expands a side air bag member between a passenger and a side wall of a vehicle (hereinafter referred to as a side door) so as to cover a door trim of the side door, during a side impact, thereby protecting mainly a shoulder, chest, and waist of the passenger from the side impact.

There has also been known an occupant protection device and an occupant protection method provided with the side air bag device and a curtain air bag device. Specifically, in the occupant protection device and the occupant protection method described above, the curtain air bag device expands a curtain air bag member between the passenger and the side door, during the side impact, so as to cover a window glass of the side door, thereby being capable of mainly protecting a head of the passenger from the side impact.

For increased safety to side impact, in order to not only protect the shoulder or the head of the passenger but also prevent the passenger from being thrown from the vehicle, an occupant protection device and an occupant protection method described below have been demanded. Specifically, it has been demanded that a curtain air bag member is expanded below a door belt of the side door that is the boundary between the window glass and the door trim (i.e., the occupant protection device and occupant protection method capable of dealing with a so-called rollover have been demanded).

The occupant protection device and the occupant protection method have a problem of interference between the side air bag member and the curtain air bag member, since the curtain air bag member is expanded below the door belt.

In other words, the occupant protection device and the occupant protection method have a technical problem that an appropriate expansion and development of each member might be hindered due to the interference between the curtain air bag member and the side air bag member.

In order to prevent the interference between the curtain air bag member and the side air bag member for securing the appropriate expansion and development of each member, it is considered that the size of the side air bag member in the vertical direction of the vehicle is set to be short.

However, if the size of the side air bag member in the vertical direction of the vehicle is set to be short, there is a possibility that the shoulder of the passenger, which is to be protected by the side air bag member, cannot be protected.

In view of this, Japanese Patent Application Laid-Open (JP-A) No. 2007-050847 describes, as a device capable of preventing the interference between the curtain air bag member and the side air bag member, a side impact air bag device in which a shoulder protective bag portion of a side air bag falls down toward a compartment in the widthwise direction of the vehicle, whereby an appropriate expansion of a head protective bag can be secured, when the side air bag and the head protective air bag interfere with each other.

In JP-A No. 2007-050847 described above, the shoulder protective bag portion of the side air bag member is pressed by the curtain air bag member for allowing the side air bag member to fall down toward the compartment in the widthwise direction of the vehicle in order to secure the appropriate expansion and development of the head protective bag (corresponding to the curtain air bag member) as described above.

Specifically, in JP-A No. 2007-050847, the side air bag member does not avoid the curtain air bag member. Therefore, the portion of the side air bag member pressed by the curtain air bag member is not constant. Accordingly, in JP-A No. 2007-050847, the expansion of the side air bag member in the appropriate direction might be inhibited, that is, the shoulder protective bag portion of the side air bag member might be fallen down to the outside in the widthwise direction of the vehicle.

In JP-A No. 2007-050847, a reaction force is generated because the side air bag member is pressed by the curtain air bag member. The side air bag member repels the curtain air bag member by the reaction force, which might inhibit the expansion of the curtain air bag member in the appropriate direction.

In JP-A No. 2007-050847, the side air bag member might be cured since the side air bag member is pressed by the curtain air bag member, resulting in that an injury level of a passenger might be increased.

As described above, the technique described in JP-A No. 2007-050847 has room for improvement for surely securing the appropriate expansion of the side air bag member and the curtain air bag member. Accordingly, the technique described in JP-A No. 2007-050847 has room for improvement for increasing safety to a side impact.

SUMMARY OF THE INVENTION

The present invention is accomplished in view of the above-mentioned conventional circumstance, and aims to provide a side air bag device, an occupant protection device and an occupant protection method that can surely secure an appropriate expansion of a side air bag member and a curtain air bag member so as to increase safety to a side impact.

In order to solve the problem described above, an aspect of the present invention provides a side air bag device that expands a side air bag member between a passenger and a vehicle side wall in a widthwise direction of the vehicle for protecting the passenger from a shock caused by an impact on the vehicle side wall. The side air bag member includes a bent portion that can expand the side air bag member in such a manner that an upper portion of the side air bag member in the vertical direction of the vehicle directs toward a compartment in the widthwise direction of the vehicle.

Preferably, the bent portion of the side air bag device should include a non-expanded portion that is formed by bringing a part of an interior panel of the side air bag member located near the compartment in the widthwise direction and a part of an exterior panel of the side air bag member located near the outside of the vehicle into intimate contact with each other so as not to expand during the expansion of the side air bag member; and a regulating member that is arranged on the interior panel for regulating the side air bag member to expand in such a manner that the upper portion of the side air bag member in the vertical direction of the vehicle directs toward the compartment in the widthwise direction of the vehicle from the non-expanded portion.

Preferably, the bent portion of the side air bag device should be formed of a knob portion that is formed by pinching the interior panel of the side air bag member located near the compartment in the widthwise direction of the vehicle.

Preferably, the bent portion of the side air bag device should include a first shift portion that is arranged on the interior panel of the side air bag member located near the compartment in the widthwise direction of the vehicle, and that is formed by shifting the interior panel downward in the vertical direction of the vehicle; and a second shift portion arranged on the exterior panel of the side air bag member located near the outside of the vehicle in the widthwise direction, and that is formed by shifting the exterior panel upward in the vertical direction of the vehicle.

Preferably, the bent portion of the side air bag device according to the present invention should be formed by providing a regulating member on the interior panel of the side air bag member located near the compartment in the widthwise direction of the vehicle, and on the exterior panel located near the outside of the vehicle.

Preferably, the bent portion of the side air bag device should be configured by forming a recessed portion having a shape of an umbrella on the interior panel of the side air bag member located near the compartment in the widthwise direction of the vehicle.

Preferably, the bent portion of the side air bag device should be configured by forming a folded portion on the exterior panel having an area larger than that of the interior panel.

Preferably, the side air bag member of the side air bag device should include a vent hole that is open frontward in the longitudinal direction of the vehicle during the expansion.

Preferably, the vent hole of the side air bag device should be formed at the front part in the longitudinal direction of the vehicle from the bent portion of the side air bag member.

Preferably, the vent hole of the side air bag device should be formed on a front end of the side air bag member in the longitudinal direction of the vehicle.

In order to solve the problem described above, another aspect of the present invention provides an occupant protection device that allows a side air bag member and a head protective bag member to expand between a vehicle side wall and a passenger in a widthwise direction of a vehicle so as to protect the passenger from a shock caused by a side impact on the vehicle side wall. The side air bag member includes a bent portion that is bent for expanding the side air bag member in such a manner that an upper portion of the side air bag member in the vertical direction of the vehicle avoids the head protective bag member during the expansion.

In order to solve the problem described above, another aspect of the present invention provides an occupant protection method that allows a side air bag member and a head protective bag member to expand between a vehicle side wall and a passenger in a widthwise direction of a vehicle so as to protect the passenger from a shock caused by a side impact on the vehicle side wall. The side air bag member includes a bent portion that is bent for expanding the side air bag member in such a manner that an upper portion of the side air bag member in the vertical direction of the vehicle avoids the head protective bag member during the expansion.

According to the side air bag device, the occupant protection device, and the passive safety method of the present invention, the side air bag member allows the curtain air bag member to move, whereby the appropriate expansion of the side air bag member and the curtain air bag member can surely be secured, and hence, safety to the side impact can be enhanced.

DETAILED DESCRIPTION OF THE PREFERRED EMBODIMENTS

Figure 1:
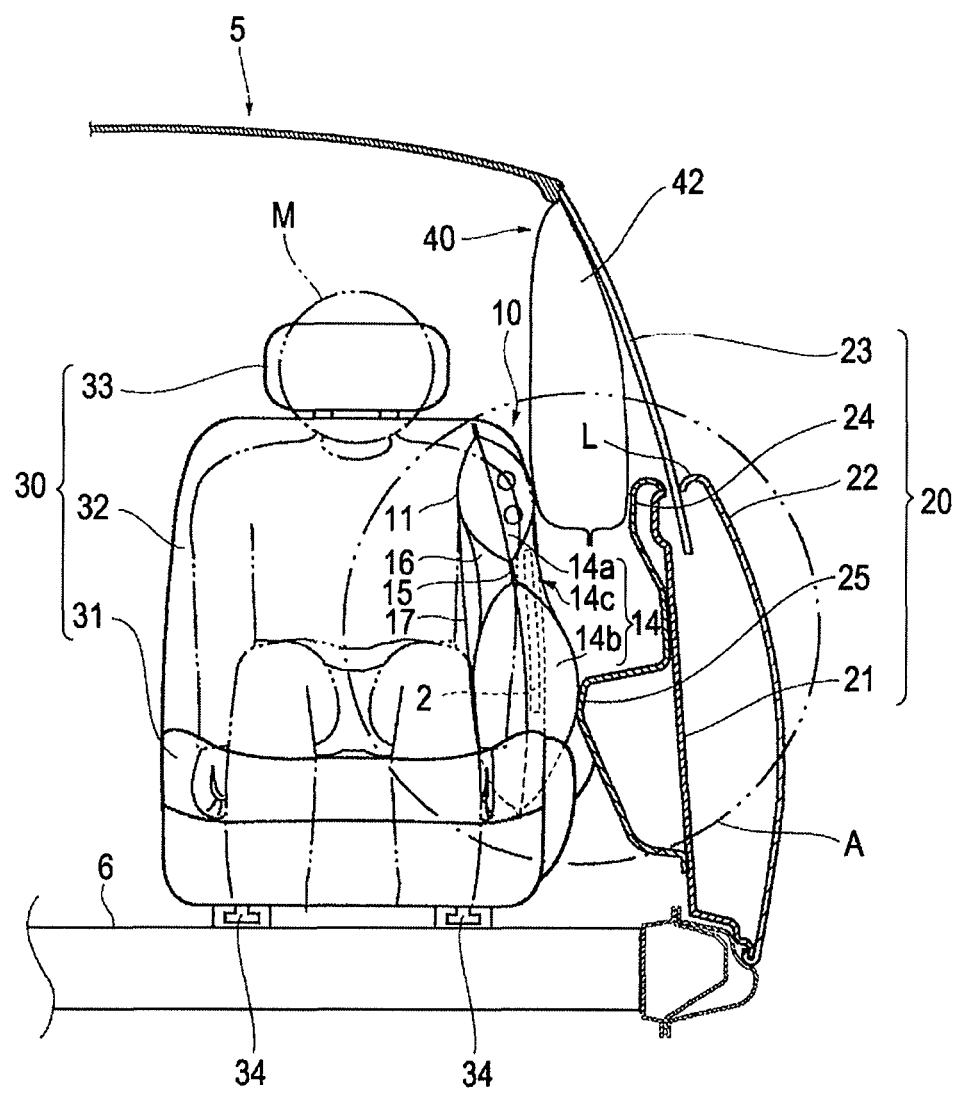
FIG. 1 is a front view schematically illustrating a configuration of an occupant protection device, according to one embodiment of the present invention, from front in the longitudinal direction of a vehicle, wherein a side air bag member and a curtain air bag member of the passive safety device are expanded.

Embodiments of the present invention will be explained in detail below with reference to the drawings. An occupant protection device according to the present embodiment expands a side air bag member 10 and a curtain air bag member (head protective air bag member) 42 between a side door (vehicle side wall) 20 and a passenger M on a vehicle seat 30 in a widthwise direction of the vehicle for protecting the passenger M from a shock caused by a side impact on the side door 20.

An occupant protection method according to the present invention expands the side air bag member 10 and the curtain air bag member 42 between the side door 20 and the passenger M on the vehicle seat 30 for protecting the passenger M from a shock caused by a side impact on the side door 20.

Specifically, a side air bag device 1 including the side air bag member 10 and a curtain air bag device 40 including the curtain air bag member 42 correspond to the occupant protection device. A method of protecting the passenger M by the side air bag device 1 and the curtain air bag device 40 according to the present embodiment corresponds to an occupant protection method.

First Embodiment

The side door 20 and the vehicle seat 30 of the vehicle 5 to which the occupant protection device according to one embodiment of the present invention is applied will be described with reference to FIGS. 1 and 2. FIG. 1 is a front view schematically illustrating the configuration of the side air bag device 1 and the occupant protection device provided with the side air bag device 1, according to one embodiment of the present invention, from front in the longitudinal direction of the vehicle, wherein the side air bag member 10 and the curtain air bag member 42 of the occupant protection device are expanded.

Figure 2:
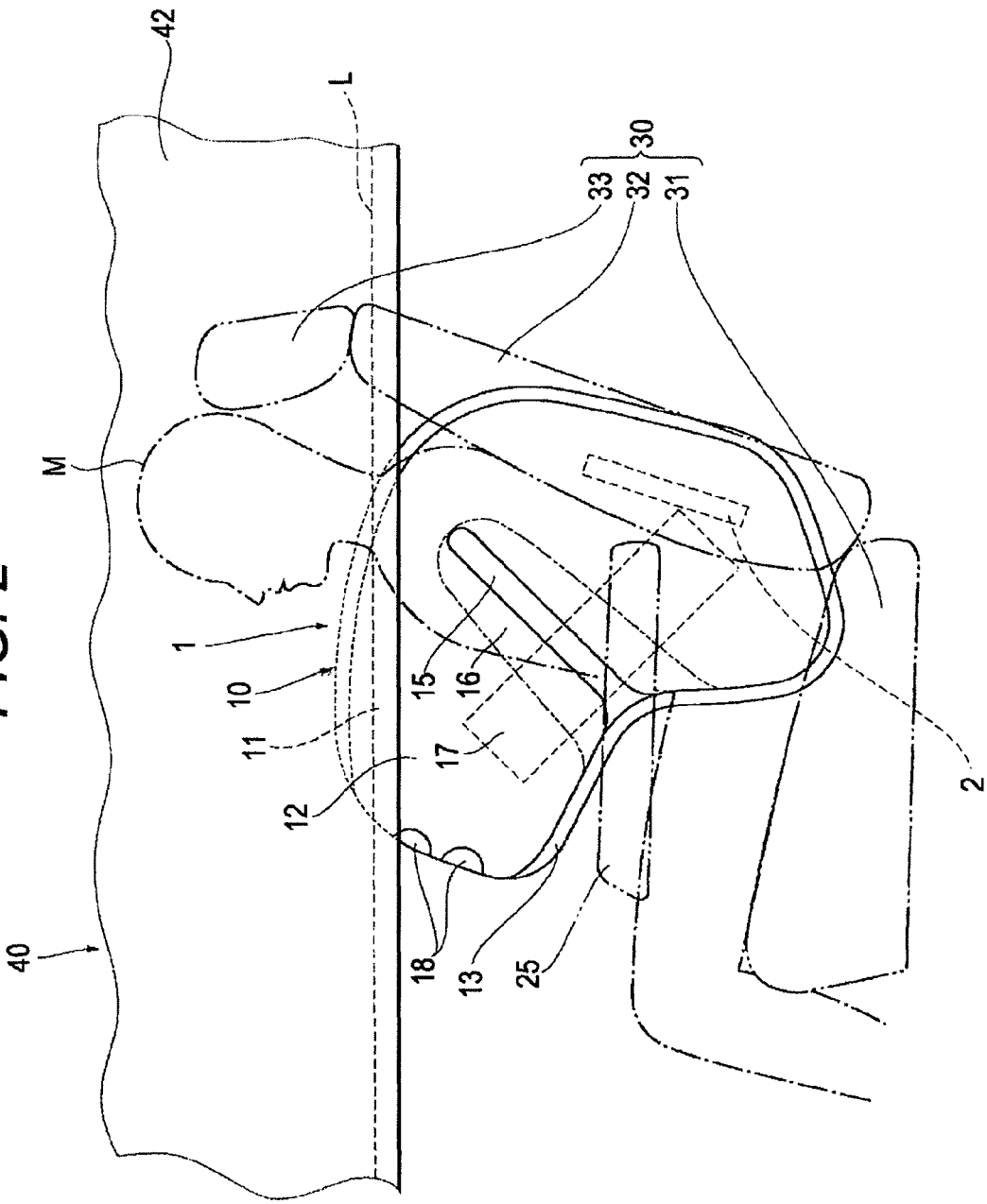
FIG. 2 is a left side view schematically illustrating the configuration of the passive safety device, according to one embodiment of the present invention, from a left side in the widthwise direction of the vehicle, wherein the side air bag member and the curtain air bag member of the passive safety device are expanded.

FIG. 2 is a left side view schematically illustrating the configuration of the side air bag device 1 and the occupant protection device provided with the side air bag device 1, according to one embodiment of the present invention, from the left side in the widthwise direction of the vehicle, wherein the side air bag member 10 and the curtain air bag member 42 of the occupant protection device are expanded.

As illustrated in FIGS. 1 and 2, the side door 20 according to the present embodiment includes an inner panel 21 and an outer panel 22, which constitute a frame of the side door 20.

The side door 20 also includes a window glass 23 that is provided between the inner panel 21 and the outer panel 22 and that can move up and down in the vertical direction of the vehicle between the inner panel 21 and the outer panel 22.

A door trim 24 is mounted to the inner panel 21, which constitutes the side door 20, near the compartment in the widthwise direction of the vehicle. A door arm rest 25 that projects toward the compartment in the widthwise direction of the vehicle is mounted to the door trim 24. The vehicle seat 30 on which the passenger M seats is provided near the door arm rest 25 in the compartment in the widthwise direction of the vehicle.

The vehicle seat 30 includes a seat cushion 31 on which the passenger M seats, and a seat back 32 that is arranged at a trailing end of the seat cushion 31 in the longitudinal direction of the vehicle for allowing the passenger M to lean thereon. The vehicle seat 30 includes a head rest 33 at the upper end of the seat back 32 in the vertical direction of the vehicle.

The seat cushion 31 constituting the vehicle seat 30 is mounted on a floor 6 of the vehicle 5 in order to be slidable in the longitudinal direction of the vehicle through a slide mechanism 34. Therefore, when the passenger M utilizes the vehicle seat 30, the passenger M can slide the vehicle seat 30 according to a taste of the passenger M in the longitudinal direction of the vehicle. The seat back 32 is mounted at the trailing end of the seat cushion 31 in the longitudinal direction of the vehicle as described above.

The seat back 32 is mounted to the seat cushion 31 through an unillustrated reclining mechanism. Therefore, when the passenger M utilizes the vehicle seat 30, the passenger M can stand or recline the seat back 32 according to a taste of the passenger M in the longitudinal direction of the vehicle.

The side air bag device 1 is mounted to the seat back 32 near the side door 20 in the widthwise direction of the vehicle. The side air bag device 1 expands the side air bag member 10 toward the front from the seat back 32 in the longitudinal direction of the vehicle.

The side air bag device 1 is mounted to the seat back 32 as described above. However, the invention is not limited thereto. For example, the side air bag device 1 may be mounted to the seat cushion 31 near the side door 20. In this case, the side air bag device 1 expands the side air bag member 10 upward in the vertical direction of the vehicle from the seat cushion 31.

The side air bag device 1 includes an inflator 2 serving as a gas injecting unit, and the side air bag member 10 that is arranged so as to be communicated with the inflator 2, and that expands with a gas injected from the inflator 2. The side air bag device 1 is configured to include a case, not illustrated, for storing the inflator 2 and the side air bag member 10.

In the present embodiment, the inflator 2, the side air bag member 10, and the case are mounted to an unillustrated frame of the seat back 32 of the vehicle seat 30. A cover is provided to the frame for covering the frame. Specifically, the inflator 2, the side air bag member 10, and the case are accommodated in the seat back 32.

The side air bag device 1 also includes an unillustrated sensor for detecting a shock caused by a side impact on the side door 20. This sensor is connected to a control circuit not illustrated. The control circuit controls the inflator 2 based on a detection signal of the sensor.

Specifically, when the gas is injected into a later-described chamber 14, formed in the side air bag member 10, from the inflator 2 that is controlled by the control circuit, the side air bag device 1 starts to expand and develop the side air bag member 10.

The side air bag device 1 also includes an unillustrated inner tube that deflects the direction of the flow of the gas injected from the inflator 2 according to the expansion state of the side air bag member 10.

As described above, the side air bag device 1 according to the present embodiment is mounted to the seat back 32 near the side door 20 in the widthwise direction of the vehicle, and expands the side air bag member 10 by the inflator 2 between the side door 20 and the passenger M, whereby a space can be secured between the side door 20 and the passenger M.

With this configuration, the side air bag device 1 prevents the passenger M from directly colliding against the side door 20 during the side impact on the side door 20, thereby protecting the passenger M from the shock caused by the side impact on the side door 20.

In the present embodiment, the occupant protection device also includes the curtain air bag device 40, in addition to the side air bag device 1, in order to protect the passenger M from the shock caused by the side impact on the side door 20.

Like the side air bag device 1, the curtain airbag device 40 includes an unillustrated inflator serving as a gas injecting unit, and the curtain air bag member 42 that is arranged so as to be communicated with the inflator, and that expands with a gas injected from the inflator.

Like the side air bag device 1, the curtain air bag device 40 also includes a sensor for detecting a shock caused by the side impact on the side door 20, and a control circuit for controlling the inflator. They have the configurations same as those in the side air bag device 1, so that the description will not be repeated.

Specifically, when the gas is injected into a chamber 44, formed in the curtain air bag member 42, from the inflator that is controlled by the control circuit, the curtain air bag device 40 starts to expand and develop the curtain air bag member 42.

The curtain air bag device 40 is arranged along a front pillar inner or a side rail inner of the vehicle 5 located at the upper end of the side door 20, those of which are not illustrated. The curtain air bag device 40 expands the curtain air bag member 42 downward in the vertical direction of the vehicle.

The curtain air bag device 40 expands the curtain air bag member 42 in such a manner that the lower end of the curtain air bag member 42 in the vertical direction of the vehicle is located below a belt line L, which corresponds to the upper end of the side door 20.

Specifically, the curtain air bag device 40 expands the curtain air bag member 42 so as to cover the surface of the window glass 23, facing the compartment, of the side door 20. Therefore, the curtain air bag device 40 prevents the passenger M from being thrown from the vehicle by the shock caused by the side impact on the side door 20 during a rollover.

The curtain air bag device 40 expands the curtain air bag member 42 in such a manner that the lower end of the curtain air bag member 42 in the vertical direction of the vehicle is located below the belt line L, which corresponds to the upper end of the side door 20. In other words, the curtain air bag device 40 expands the curtain air bag member 42 in such a manner that the lower end of the curtain air bag member 42 is overlapped with the upper end of the door trim 24.

Accordingly, in the curtain air bag device 40, even when the window glass 23 is broken, or the window glass 23 is opened, during the rollover, the curtain air bag member 42 is supported by the door trim 24. Consequently, this structure can prevent the curtain air bag member 42 from flying out of the vehicle.

Accordingly, the curtain air bag device 40 has a function of preventing the passenger M from being thrown from the vehicle by the shock caused by the side impact on the side door 20 during the rollover, and of protecting a head of the passenger M with the curtain air bag member 42.

As described above, the curtain air bag device 40 according to the present embodiment is arranged on the front pillar inner or the side rail inner along the longitudinal direction of the vehicle, and expands the curtain air bag member 42 between the side door 20 and the passenger M by the inflator, thereby protecting the passenger M from the shock caused by the side impact on the side door 20.

Here, the lower end of the curtain air bag member 42 in the vertical direction of the vehicle and the upper end of the side air bag member 10 might interfere with each other during the expansion. Specifically, the curtain air bag member 42 is configured to expand downward in the vertical direction of the vehicle from the front pillar inner or the side rail inner, as described above.

The curtain air bag device 40 according to the present embodiment expands the curtain air bag member 42 in such a manner that the lower end of the curtain air bag member 42 is located below the belt line L, which corresponds to the upper end of the side door 20, in order to prevent the passenger M from being thrown from the vehicle by the shock caused by the side impact on the vehicle side wall.

On the other hand, the side air bag member 10 is configured to expand frontward in the longitudinal direction of the vehicle from the side of the seat back 32 as described above. The side air bag device 1 expands the upper end of the side air bag member 10 above the belt line L in order to protect the passenger M, especially, the shoulder of the passenger M, from the shock caused by the side impact on the vehicle side wall.

Therefore, the lower end of the curtain air bag member 42 in the vertical direction of the vehicle and the upper end of the side air bag member 10 might collide with each other during the expansion, which means they mutually inhibit the expansion to the appropriate position.

On the other hand, in the occupant protection device according to the present embodiment, a first chamber 14a, described later, of the side air bag member 10 is expanded toward the compartment in the widthwise direction of the vehicle, in order to secure the appropriate expansion of the curtain air bag member 42 and the side air bag member 10.

Figure 3:
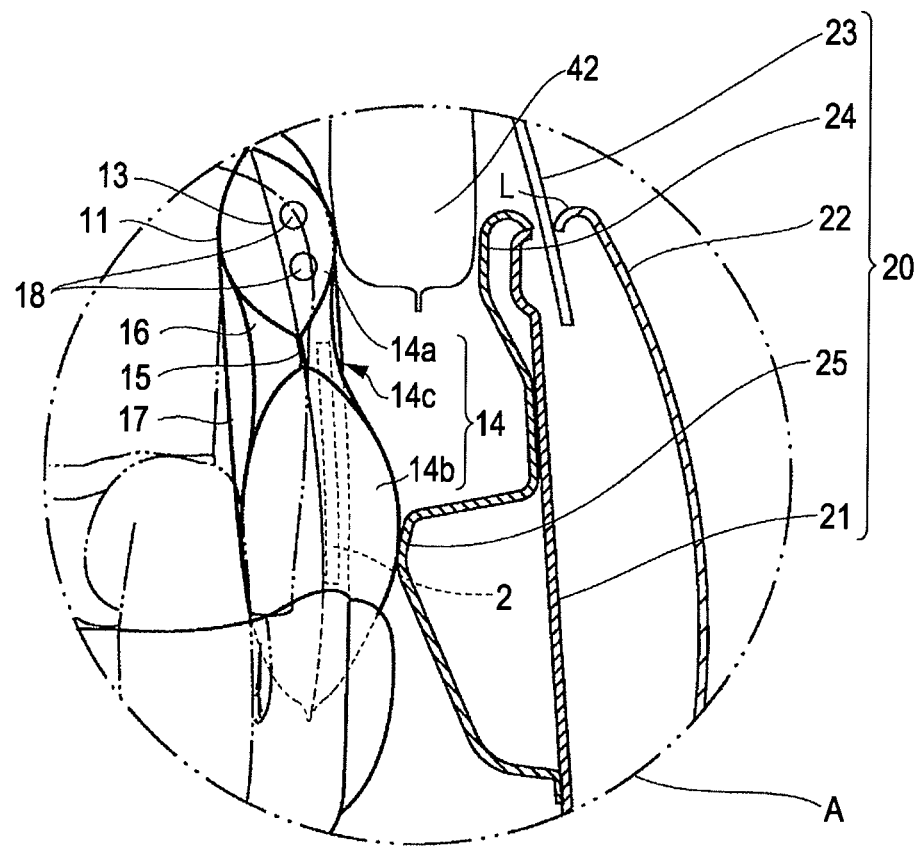
FIG. 3 is a front view illustrating an A portion in FIG. 1 as being enlarged.

Configurations of a communication chamber 14c, a non-expanded portion 15, and a tether 17 (collectively referred to as a bent portion) for expanding the first chamber 14a of the side air bag member 10 toward the compartment in the widthwise direction of the vehicle will be described with reference to FIGS. 3 to 6. FIG. 3 is a front view illustrating an A portion in FIG. 1 as being enlarged.

Figure 4:
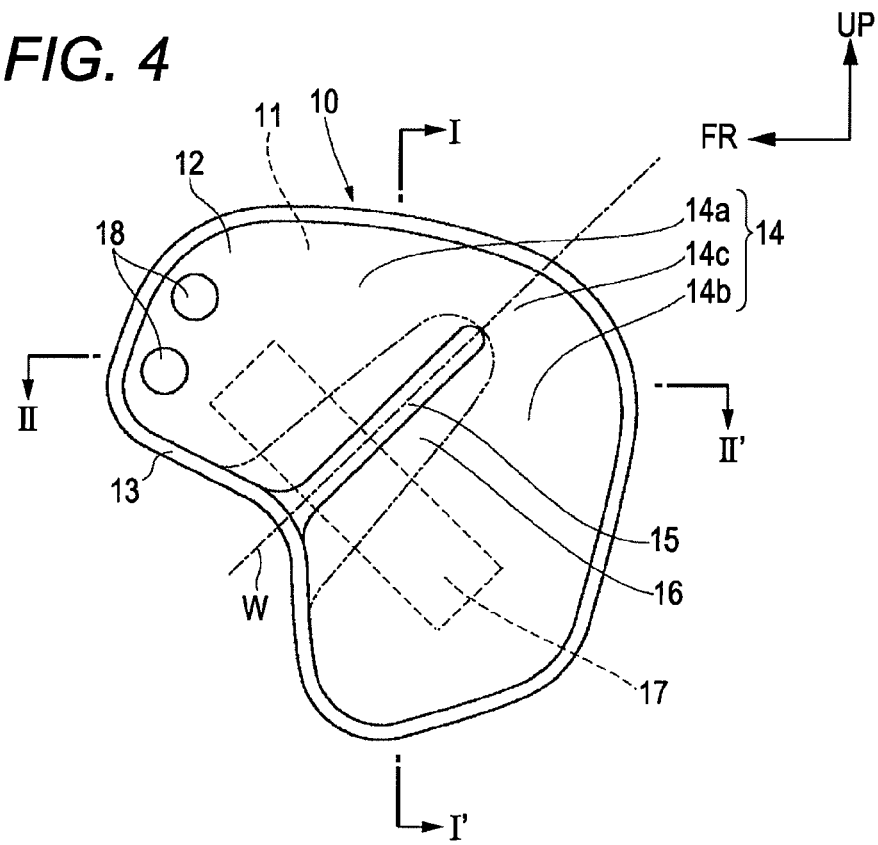
FIG. 4 is a side view schematically illustrating the configuration of the side air bag member, according to one embodiment of the present invention, from a side in the widthwise direction of the vehicle.
Figure 5:
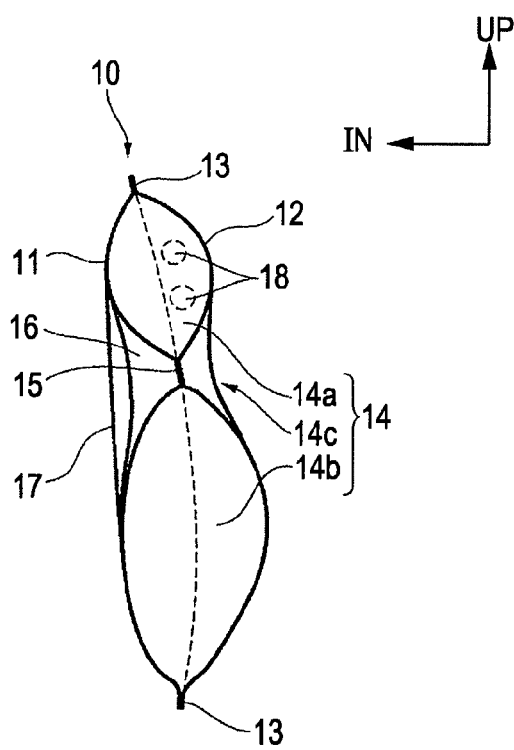
FIG. 5 is a schematic sectional view taken along a line I-I' in FIG. 4.
Figure 6:
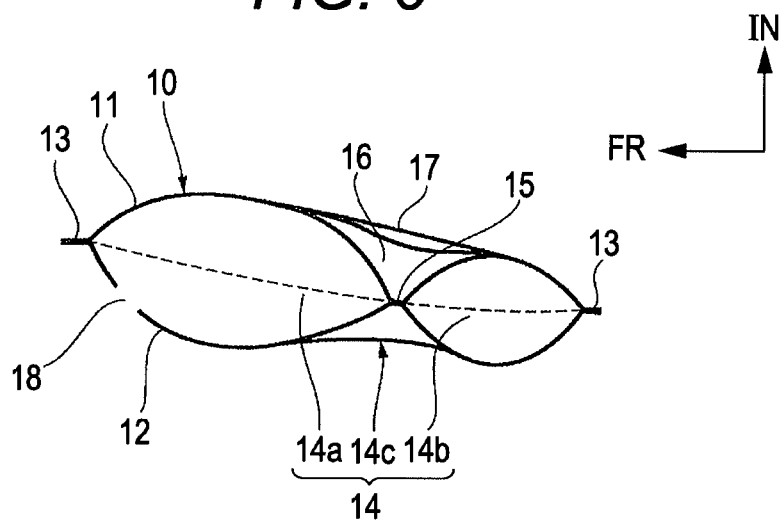
FIG. 6 is a schematic sectional view taken along a line II-II' in FIG. 4.

FIG. 4 is a side view schematically illustrating the configuration of the side air bag member 10, according to one embodiment of the present invention, from a side in the widthwise direction of the vehicle; FIG. 5 is a schematic sectional view taken along a line I-I' in FIG. 4; and FIG. 6 is a schematic sectional view taken along a line II-II' in FIG. 4.

As illustrated in FIGS. 3 to 6, the side air bag member 10 according to the present embodiment is formed into a bag-like shape by sewing a pair of ground fabrics made of a fireproofed woven fabric, for example.

Specifically, the side air bag member 10 includes an interior panel 11 located near the compartment in the widthwise direction, and an exterior panel 12 located near the outside of the vehicle so as to be opposite to the interior panel 11.

The side air bag member 10 also includes a sealing portion 13 for sealing the outer periphery of the interior panel 11 and the exterior panel 12. Specifically, the side air bag member 10 is formed into a bag-like shape, since the outer periphery of the interior panel 11 and the exterior panel 12 is sealed by the sealing portion 13.

In the present embodiment, the sealing portion 13 seals the outer periphery of the interior panel 11 and the exterior panel 12 by sewing. The sealing portion 13 is not limited to be made by the sewing process, so long as it can seal the outer periphery of the interior panel 11 and the exterior panel 12. For example, the outer periphery of the interior panel 11 and the exterior panel 12 may be sealed by bonding or welding.

The side air bag member 10 formed into the bag-like shape is expanded and developed with the supply of the gas from the inflator 2. The side air bag member 10 includes the chamber 14 therein.

The side air bag member 10 also includes, in addition to the sealing portion 13, the non-expanded portion (shielding portion) 15 that does not expand during the expansion of the side air bag member 10, since a part of the interior panel 11 and a part of the exterior panel 12 are sewn as being brought into contact with each other.

The non-expanded portion 15 is arranged almost at a center of the side air bag member 10 as viewed in the widthwise direction of the vehicle, and formed so as to equally divide the chamber 14. Specifically, the chamber 14 has the first chamber 14a located above the non-expanded portion 15 and a second chamber 14b located below the non-expanded portion 15 across an axis W of the non-expanded portion 15.

The side air bag member 10 according to the present embodiment protects a shoulder mainly by the first chamber 14a located above the non-expanded portion 15, while protecting a chest and waist mainly by the second chamber 14b located below the non-expanded portion 15 across the axis W of the non-expanded portion 15. However, the present invention is not Limited thereto. The non-expanded portion 15 may be located to a position where the first chamber 14a may protect a chest, and the second chamber 14b may protect a waist.

The chamber 14 is located on the axis W, and has a communication chamber 14c that allows the first chamber 14a and the second chamber 14b to be communicated with each other. As described above, the chamber 14 according to the present invention has formed therein the first chamber 14a, the second chamber 14b, and the communication chamber 14c with the supply of the gas from the inflator 2.

In the present embodiment, the side air bag member 10 includes the non-expanded portion 15 that does not expand during the expansion as described above. Therefore, the side air bag member 10 forms a recessed portion 16 at the non-expanded portion 15 and in the vicinity of the outer periphery of the non-expanded portion 15.

Specifically, the non-expanded portion 15 and the recessed portion 16 are difficult to supply the gas from the inflator 2 to the first chamber 14a and the second chamber 14b of the chamber 14, and they are easy to be folded during the expansion of the side air bag member 10.

The side air bag member 10 is configured to include the tether (regulating member) 17 on the interior panel 11. Like the interior panel 11 and the exterior panel 12, the tether 17 is made of a ground fabric of a fireproofed woven fabric.

One end of the tether 17 is sewn almost in the center of the first chamber 14a. On the other hand, the other end of the tether 17 is sewn almost in the center of the second chamber 14b. In this case, the tether 17 is set to have a size shorter than the distance between the center of the first chamber 14a to the center of the second chamber 14b.

When the gas is supplied from the inflator 2 to the first chamber 14a, the second chamber 14b, and the communication chamber 14c, the side air bag member 10 is folded on the non-expanded portion 15 and the recessed portion 16, and expands the first chamber 14a toward the compartment in the widthwise direction of the vehicle by the tether 17.

As described above, the side air bag member 10 according to the present embodiment expands the first chamber 14a toward the compartment in the widthwise direction of the vehicle, whereby it expands as avoiding the curtain air bag member 42.

Thus, the side air bag member 10 can allow the curtain air bag member 42 to move outward in the widthwise direction of the vehicle. Therefore, the side air bag member 10 according to the present embodiment expands so as to avoid the interference with the curtain air bag member 42.

Upon forming the bent portion, a part of the interior panel 11 and a part of the exterior panel 12 are sewn as being brought into contact with each other, whereby the non-expanded portion 15 is formed, as described above. Therefore, the side air bag member 10 according to the present embodiment is easy to be folded, and further, the first chamber 14a is expanded toward the compartment in the widthwise direction of the vehicle by the tether 17 from the non-expanded portion 15. Accordingly, the size of the interior panel 11 and the size of the exterior panel 12 are not made different.

Specifically, the side air bag member 10 can use the interior panel 11 and the exterior panel 12 having the same shape. Accordingly, the side air bag member 10 can allow a panel having the same size to be mass-produced. When the sealing portion 13 is sewn, it is unnecessary to make a sewing operation according to a size of one of them. Therefore, one process in the sewing operation can be skipped in the side air bag member 10. Thus, the side air bag member 10 can reduce cost.

The side air bag member 10 according to the present embodiment is configured to have a vent hole 18 on the exterior panel 12. The vent hole 18 is formed on the front part of the exterior panel 12 in the longitudinal direction of the vehicle.

The side air bag member 10 is configured to be capable of expanding the first chamber 14a toward the compartment in the widthwise direction of the vehicle as described above. Specifically, the front end of the exterior panel 12 faces forward, when the side air bag member 10 expands.

Specifically, since the vent hole 18 is formed on the front end of the exterior panel 12 as described above, the vent hole 18 faces forward, when the side air bag member 10 expands.

Therefore, the vent hole 18 is formed at the position where the vent hole 18 does not interfere with the curtain air bag member 42 during the expansion of the side air bag member 10, and at the position where the vent hole 18 does not contact to the passenger M. With this configuration, the vent hole 18 of the side air bag member 10 according to the present embodiment is not closed by the curtain air bag member 42, which can prevent the side air bag member 10 from being cured after the expansion.

Accordingly, the curing of the side air bag member 10 after the expansion can be prevented, whereby the injury level of the passenger M can be reduced, and safety can more be enhanced, according to the side air bag member 10 of the present embodiment.

In the side air bag member 10, the vent hole 18 is formed at the position where the vent hole 18 is not in contact with the passenger M. Therefore, an injury level of the passenger M, such as burn injury caused by a high-temperature gas exhausted from the vent hole 18, can be reduced, resulting in that the safety can be enhanced.

As described above, the side air bag device 1 according to the present embodiment can expand the side air bag member 10 so as not to interfere with the curtain air bag member 42. Thus, the side air bag device 1 according to the present embodiment can expand the side air bag member 10 and the curtain air bag member 42 to a desired position, i.e., can realize a desired relative position of the side air bag member 10 and the curtain air bag member 42 (can expand the side air bag member 10 toward the compartment in the widthwise direction of the vehicle).

The side air bag device 1 according to the present embodiment is configured such that the vent hole 18 is open forward in the longitudinal direction of the vehicle during the expansion as described above. Therefore, the occupant protection device according to the present embodiment expands the side air bag member 10 without closing the vent hole 18, whereby the gas in the side air bag member 10 can stably be exhausted to the outside.

Accordingly, the side air bag device 1 according to the present embodiment can prevent the side air bag member 10 from being cured, thereby being capable of reducing the injury level of the passenger.

In the side air bag device 1, the vent hole 18 is open forward in the longitudinal direction of the vehicle. This structure can prevent the vent hole 18 from being in contact with the passenger. Accordingly, the side airbag device 1 can reduce the injury level of the passenger due to a burn injury, thereby being capable of enhancing safety.

The occupant protection device according to the present embodiment provided with the side air bag device 1 and the curtain air bag device 40 expands the first chamber 14a of the side air bag member 10 toward the compartment in the widthwise direction of the vehicle. Accordingly, the occupant protection device prevents the interference between the side air bag member 10 and the curtain air bag member 42.

The occupant protection device is configured not to inhibit the appropriate expansion of the side air bag member 10 and the curtain air bag member 42. Consequently, the required performance of the side air bag member 10 and the curtain air bag member 42 is exhibited.

As described above, the occupant protection device according to the present embodiment can secure the appropriate expansion of the curtain air bag member 42 that is expanded with the side air bag member 10. Consequently, the occupant protection device provided with the side air bag member 10 and the curtain air bag member 42 can surely secure the appropriate expansion of the side air bag member 10 and the curtain air bag member 42, thereby being capable of enhancing safety to the side impact.

Second Embodiment

Figure 7:
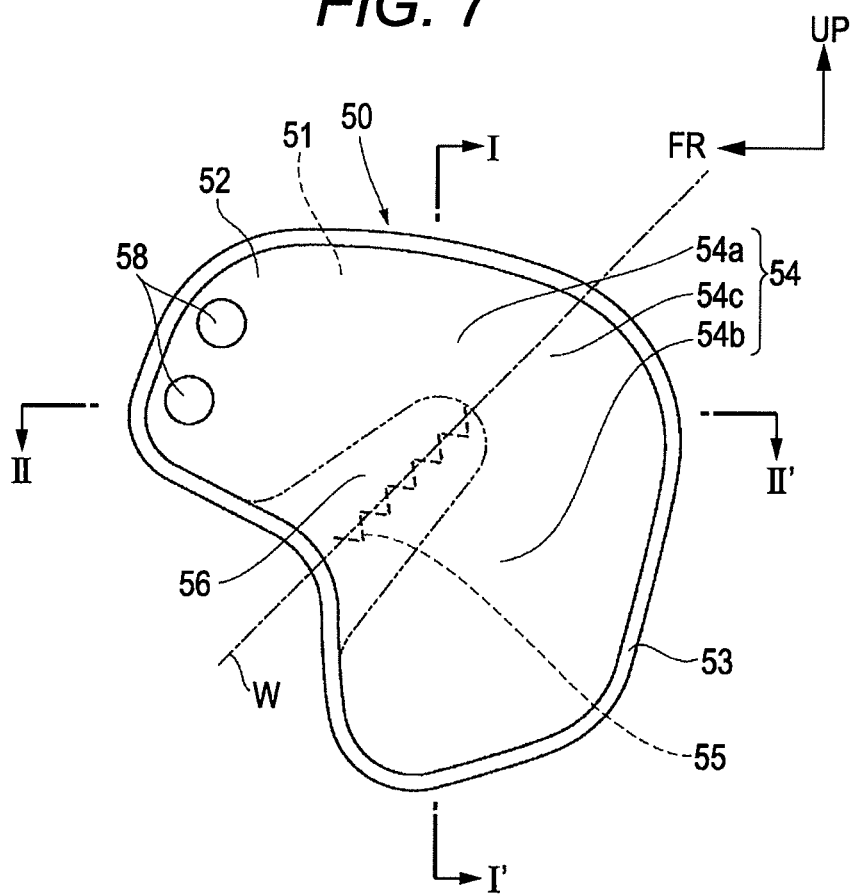
FIG. 7 is a side view schematically illustrating a configuration of a side air bag member, according to another embodiment of the present invention, from a side in a widthwise direction of a vehicle.
Figure 8:
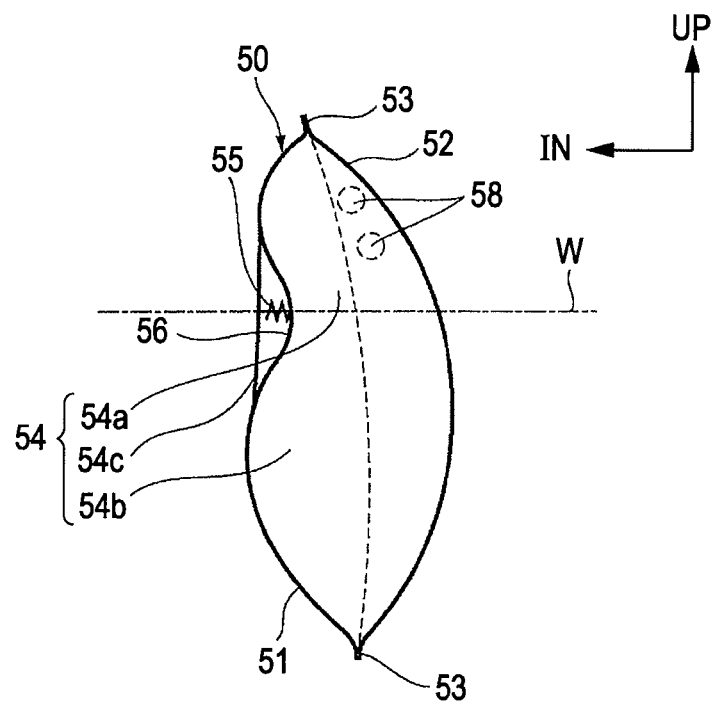
FIG. 8 is a schematic sectional view taken along a line I-I' in FIG. 7.

An occupant protection device according to another embodiment of the present invention will be described with reference to FIGS. 7 to 9. FIG. 7 is a side view schematically illustrating a configuration of a side air bag member 50, according to another embodiment of the present invention, from a side in a widthwise direction of a vehicle; FIG. 8 is a schematic sectional view taken along a line I-I' in FIG. 7; and FIG. 9 is a schematic sectional view taken along a line II-II' in FIG. 7.

The occupant protection device according to the present embodiment is the same as that in the first embodiment, except for a configuration of a knob portion (bent portion) 55 that expands a first chamber 54a of the side air bag member 50 toward the compartment in the widthwise direction of the vehicle. Therefore, the components same as those in the first embodiment are identified by the same numerals, and the description thereof will not be repeated.

Figure 9:
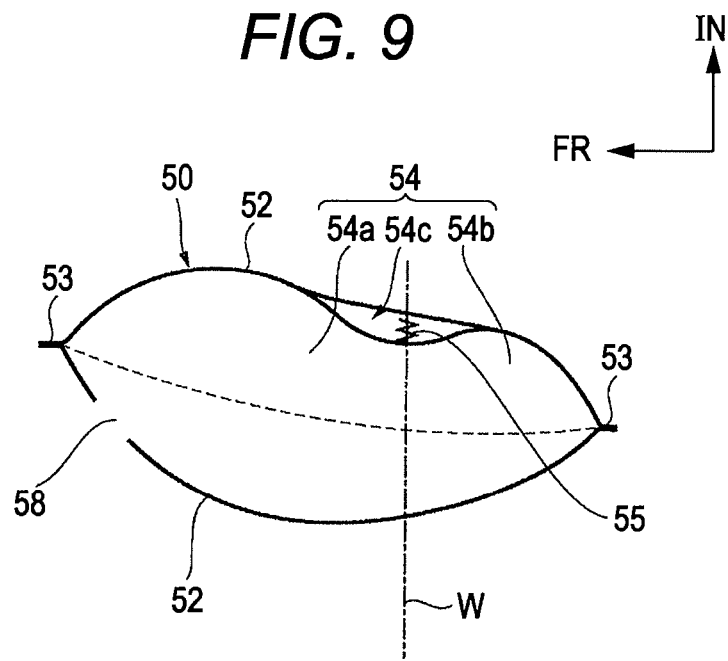
FIG. 9 is a schematic sectional view taken along a line II-II' in FIG. 7.

As illustrated in FIGS. 7 to 9, the knob portion 55 of the side air bag member 50 according to the present embodiment is formed by sewing, wherein a part of an interior panel 51 is pinched. The interior panel 51 and an exterior panel 52 are made of panels almost having the same size. The outer periphery of the interior panel 51 and the exterior panel 52 is sealed by a sealing portion 53, whereby the side air bag member 50 is formed into a bag-like shape.

The side air bag member 50 is made by using the interior panel 51 and the exterior panel 52, those of which have the same size, wherein the outer periphery of the interior panel 51 and the exterior panel 52 is sewn with the interior panel 51 being pinched to form the knob portion 55. Accordingly, the first chamber 54a can be expanded toward the compartment in the widthwise direction of the vehicle during the expansion.

Since the side air bag member 50 according to the present embodiment expands the first chamber 54a toward the compartment in the widthwise direction of the vehicle, it is configured to expand as avoiding the curtain air bag member 42.

Specifically, the side air bag member 50 according to the present embodiment can allow the curtain air bag member 42 to move outward in the widthwise direction of the vehicle. Accordingly, as in the first embodiment, the occupant protection device in the present embodiment can also prevent the interference between the side air bag member 50 and the curtain air bag member 42.

Consequently, as in the first embodiment, the occupant protection device according to the present embodiment can secure the appropriate expansion of the curtain air bag member 42 that is expanded together with the side air bag member 50.

Consequently, the occupant protection device provided with the side air bag member 50 and the curtain air bag member 42 can surely secure the appropriate expansion of the side air bag member 50 and the curtain air bag member 42, thereby being capable of enhancing safety to the side impact.

Upon forming the bent portion, the size of the interior panel 51 and the size of the exterior panel 52 are not different from each other in the side air bag member 50 according to the present embodiment, as in the first embodiment.

Specifically, the side air bag member 50 can use the interior panel 51 and the exterior panel 52 having the same shape, as in the above-mentioned first embodiment. Thus, the side air bag member 50 can reduce cost.

Third Embodiment

Figure 10:
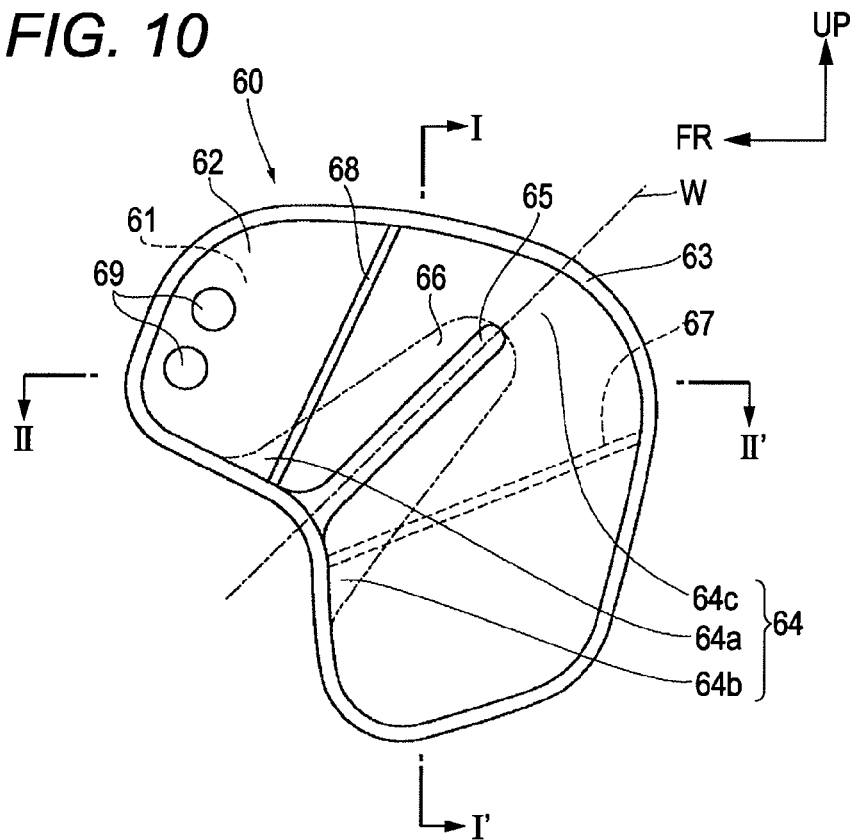
FIG. 10 is a side view schematically illustrating a configuration of a side air bag member, according to another embodiment of the present invention, from a side in a widthwise direction of a vehicle.
Figure 11:
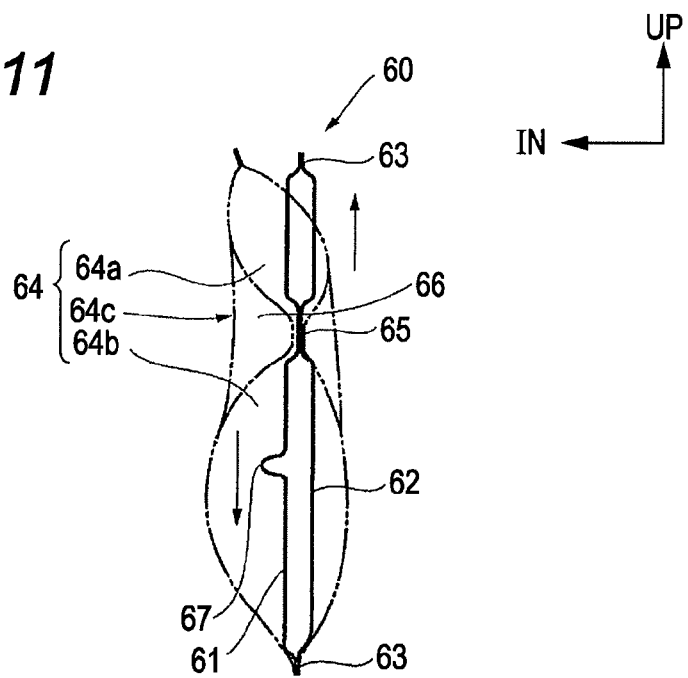
FIG. 11 is a schematic sectional view taken along a line I-I' in FIG. 10.

An occupant protection device according to another embodiment of the present invention will be described with reference to FIGS. 10 to 12. FIG. 10 is a side view schematically illustrating a configuration of a side air bag member 60, according to another embodiment of the present invention, from a side in a widthwise direction of a vehicle; FIG. 11 is a schematic sectional view taken along a line I-I' in FIG. 10; and FIG. 12 is a schematic sectional view taken along a line II-II' in FIG. 10.

The side air bag member 60 according to the present embodiment is the same as those in the first and second embodiments, except for configurations of a non-expanded portion 65, a first shift portion 67, and a second shift portion 68 (collectively referred to as a bent portion) for expanding a first chamber 64a toward the compartment in the widthwise direction of the vehicle. Therefore, the components same as those in the first and second embodiments are identified by the same numerals, and the description thereof will not be repeated.

Figure 12:
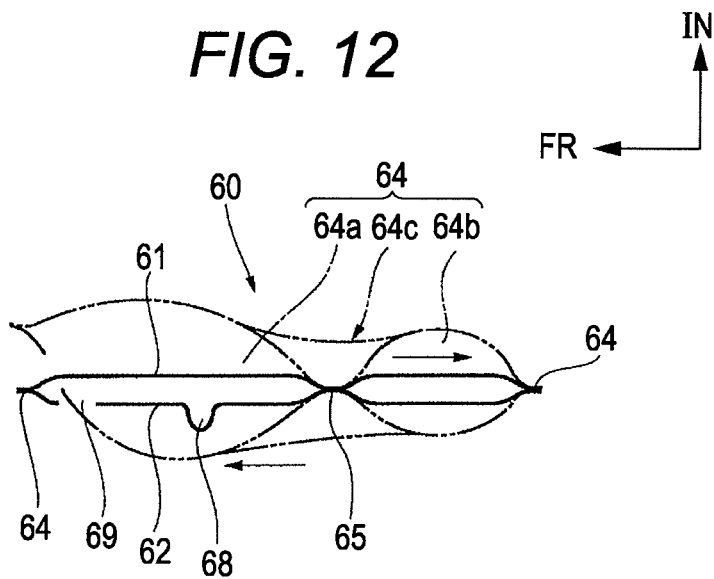
FIG. 12 is a schematic sectional view taken along a line II-II' in FIG. 10.

As illustrated in FIGS. 10 to 12, the side air bag member 60 according to the present embodiment includes the first shift portion 67 and the second shift portion 68, which are arranged to the interior panel 61 and the exterior panel 62, respectively, and which shift the interior panel 61 and the exterior panel 62 in different directions respectively.

The side air bag member 60 also includes the non-expanded portion 65 that is formed in such a manner that the interior panel 61 and the exterior panel 62 are brought into contact with each other with the first shift portion 67 and the second shift portion 68 being maintained, and with this state, they are sewn.

Specifically, the first shift portion 67 is formed by pinching the interior panel 61 near the second chamber 64b. On the other hand, the second shift portion 68 is formed by pinching the exterior panel 62 near the first chamber 64a. The non-expanded portion 65 that is the boundary between the first chamber 64a and the second chamber 64b are sewn.

Specifically, the exterior panel 62 is in a loose state, in detail, bulged in the first chamber 64a of the side air bag member 60, while the interior panel 61 is bulged in the second chamber 64b. Since the exterior panel 62 is bulged in the first chamber 64a of the side air bag member 60, the side air bag member 60 can be expanded in such a manner that the first chamber 64a directs toward the compartment in the widthwise direction of the vehicle during the expansion.

Accordingly, as in the first and second embodiments, the occupant protection device in the present embodiment can also prevent the interference between the side air bag member 60 and the curtain air bag member 42.

Consequently, as in the first and second embodiments, the occupant protection device according to the present embodiment can secure the appropriate expansion of the curtain air bag member 42 that is expanded together with the side air bag member 60.

Consequently, the occupant protection device provided with the side air bag member 60 and the curtain air bag member 42 can surely secure the appropriate expansion of the side air bag member 60 and the curtain air bag member 42, thereby being capable of enhancing safety to the side impact.

Upon forming the bent portion, the size of the interior panel 61 and the size of the exterior panel 62 are not different from each other in the side air bag member 60 according to the present embodiment, as in the first and second embodiments.

Specifically, the side air bag member 60 can use the interior panel 61 and the exterior panel 62 having the same shape, as in the above-mentioned first and second embodiments. Thus, the side air bag member 60 can reduce cost.

The side air bag member 60 according to the present embodiment maintains the first shift portion 67 and the second shift portion 68 before the expansion by the non-expanded portion 65. However, the present invention is not limited thereto. For example, the first shift portion 67 and the second shift portion 68 may be maintained by tacking the first shift portion 67 and the second shift portion 68 to a degree in which they are unstitched during the expansion.

Fourth Embodiment

Figure 13:
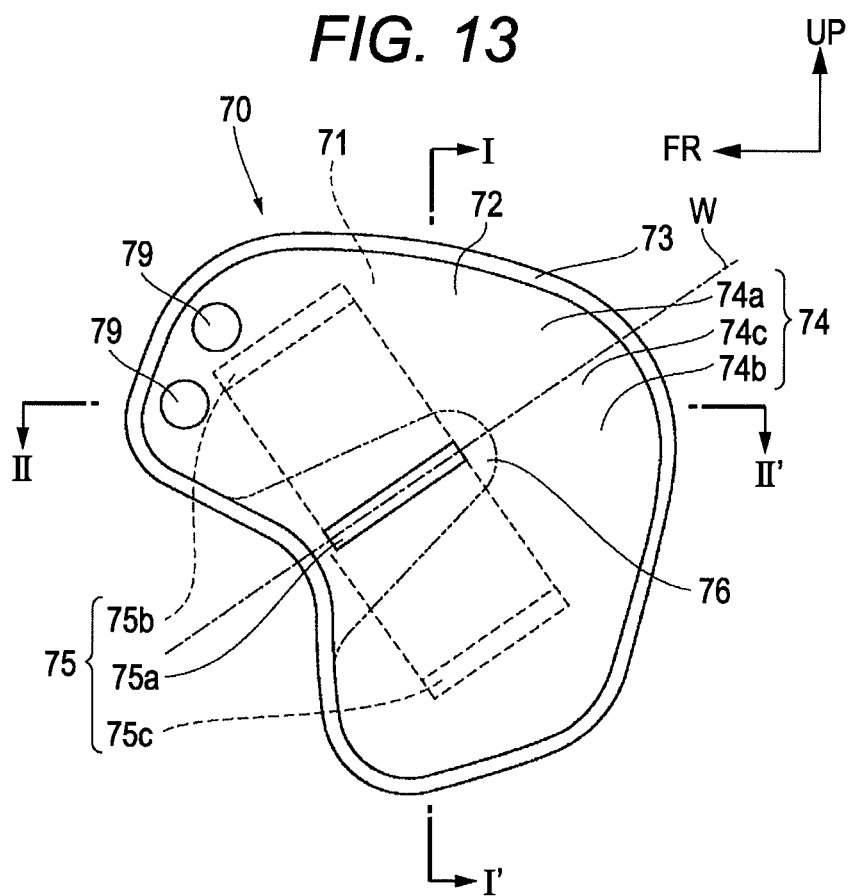
FIG. 13 is a side view schematically illustrating a configuration of a side air bag member, according to another embodiment of the present invention, from a side in a widthwise direction of a vehicle.
Figure 14:
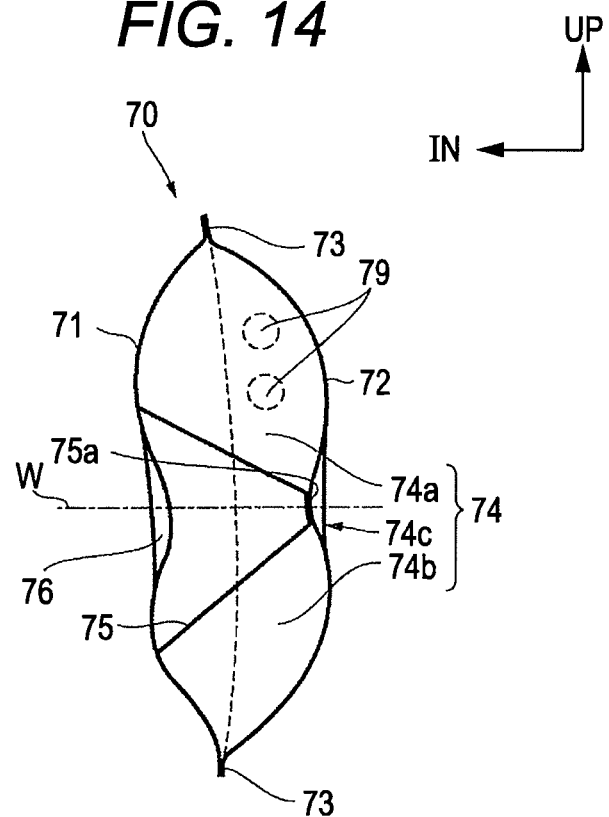
FIG. 14 is a schematic sectional view taken along a line I-I' in FIG. 13.

An occupant protection device according to another embodiment of the present invention will be described with reference to FIGS. 13 to 15. FIG. 13 is a side view schematically illustrating a configuration of a side air bag member 70, according to another embodiment of the present invention, from a side in a widthwise direction of a vehicle; FIG. 14 is a schematic sectional view taken along a line I-I' in FIG. 13; and FIG. 15 is a schematic sectional view taken along a line II-II' in FIG. 13.

The occupant protection device according to the present embodiment is the same as that in the first to third embodiments, except for a configuration of a regulating member (bent portion) 75 that expands a first chamber 74a toward the compartment in the widthwise direction of the vehicle. Therefore, the components same as those in the first to third embodiments are identified by the same numerals, and the description thereof will not be repeated.

Figure 15:
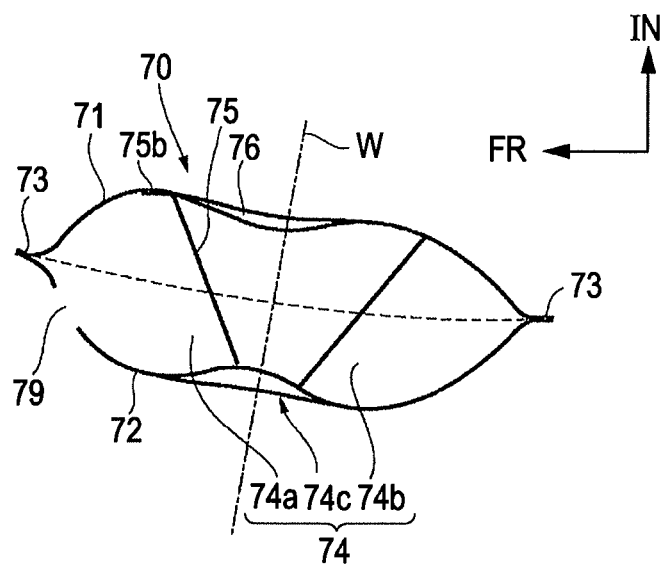
FIG. 15 is a schematic sectional view taken along a line II-II' in FIG. 13.

As illustrated in FIGS. 13 to 15, the side air bag member 70 is configured to include a tether 75 (regulating member) provided between an exterior panel 72 and an interior panel 71, i.e., in a chamber 74.

The tether 75 has a single bonded surface 75a on the exterior panel 72, and two bonded surfaces 75b and 75c on the interior panel 71. The bonded surface 75a is arranged on the boundary of the first chamber 74a and the second chamber 74b, i.e., on the axis W.

The bonded surface 75b is arranged in the first chamber 74a, while the bonded surface 75c is arranged in the second chamber 74b. The tether 75 is formed such that the distance from the bonded surface 75a to the bonded surface 75c is set to be shorter than the distance from the bonded surface 75a to the bonded surface 75b.

Specifically, the interior panel 71 of the side air bag member 70 according to the present embodiment is stretched toward the second chamber 74b by the tether 75. Therefore, the side air bag member 70 can expand the first chamber 74a toward the compartment in the widthwise direction of the vehicle during the expansion.

Accordingly, as in the first to third embodiments, the occupant protection device in the present embodiment can also prevent the interference between the side air bag member 70 and the curtain air bag member 42.

Consequently, as in the first to third embodiments, the occupant protection device according to the present embodiment can secure the appropriate expansion of the curtain air bag member 42 that is expanded together with the side air bag member 70.

Consequently, the occupant protection device provided with the side air bag member 70 and the curtain air bag member 42 can surely secure the appropriate expansion of the side air bag member 70 and the curtain air bag member 42, thereby being capable of enhancing safety to the side impact.

Upon forming the bent portion, the size of the interior panel 71 and the size of the exterior panel 72 are not different from each other in the side air bag member 70 according to the present embodiment, as in the first to third embodiments.

Specifically, the side air bag member 70 can use the interior panel 71 and the exterior panel 72 having the same shape, as in the above-mentioned first to third embodiments. Thus, the side air bag member 70 can reduce cost.

Fifth Embodiment

Figure 16:
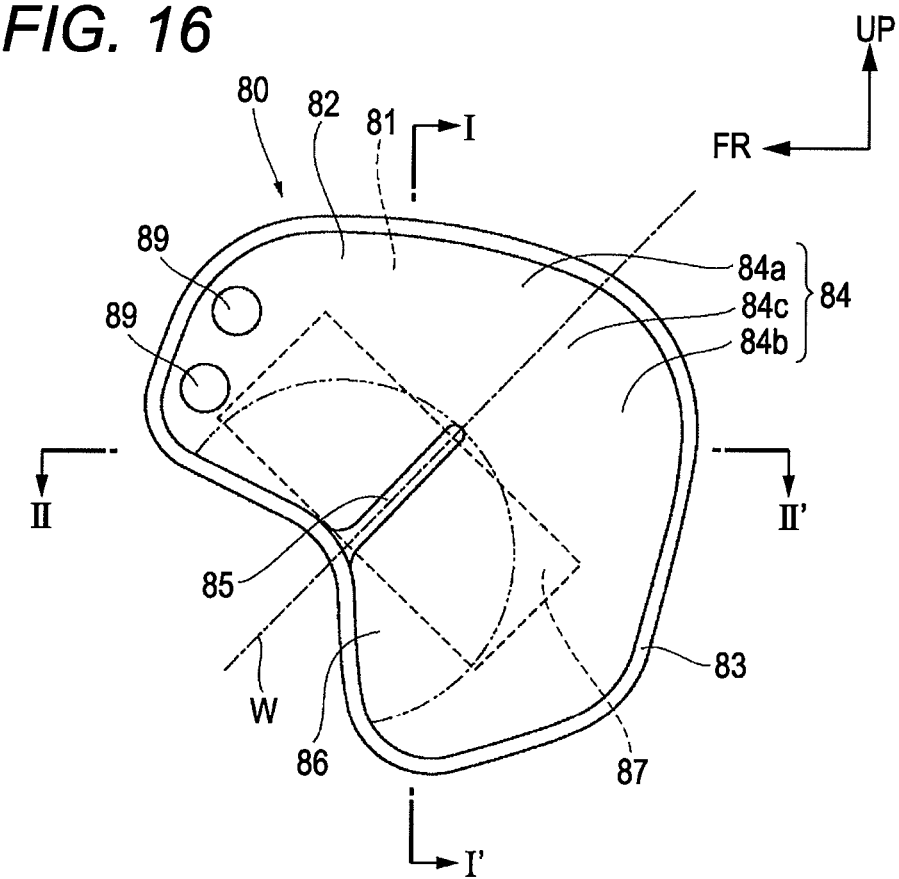
FIG. 16 is a side view schematically illustrating a configuration of a side air bag member, according to another embodiment of the present invention, from a side in a widthwise direction of a vehicle.
Figure 17:
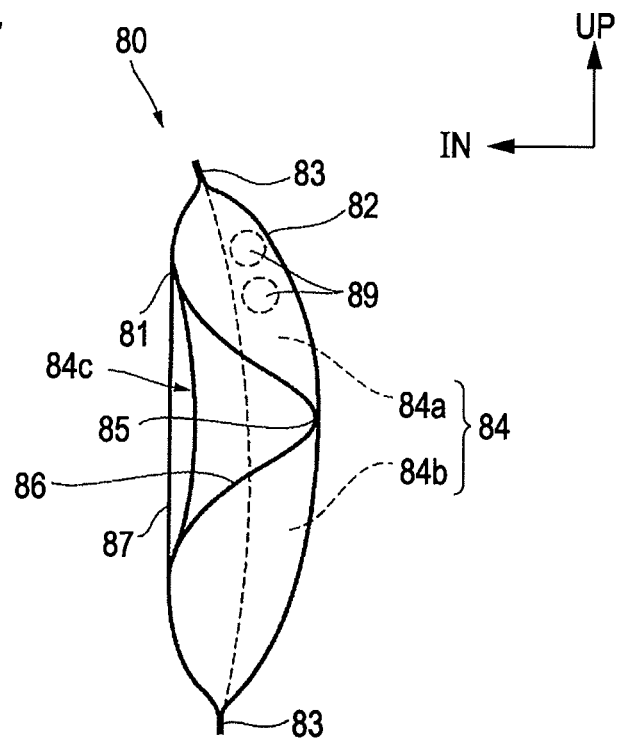
FIG. 17 is a schematic sectional view taken along a line I-I' in FIG. 16.

An occupant protection device according to another embodiment of the present invention will be described with reference to FIGS. 16 to 18. FIG. 16 is a side view schematically illustrating a configuration of a side air bag member 80, according to another embodiment of the present invention, from a side in a widthwise direction of a vehicle; FIG. 17 is a schematic sectional view taken along a line I-I' in FIG. 16; and FIG. 18 is a schematic sectional view taken along a line II-II' in FIG. 16.

The occupant protection device according to the present embodiment is the same as those in the first to fourth embodiments, except for configurations of a non-expanded portion 85, and a recessed portion 86 (a bent portion) for expanding a first chamber 84a toward the compartment in the widthwise direction of the vehicle. Therefore, the components same as those in the first to fourth embodiments are identified by the same numerals, and the description thereof will not be repeated.

Figure 18:
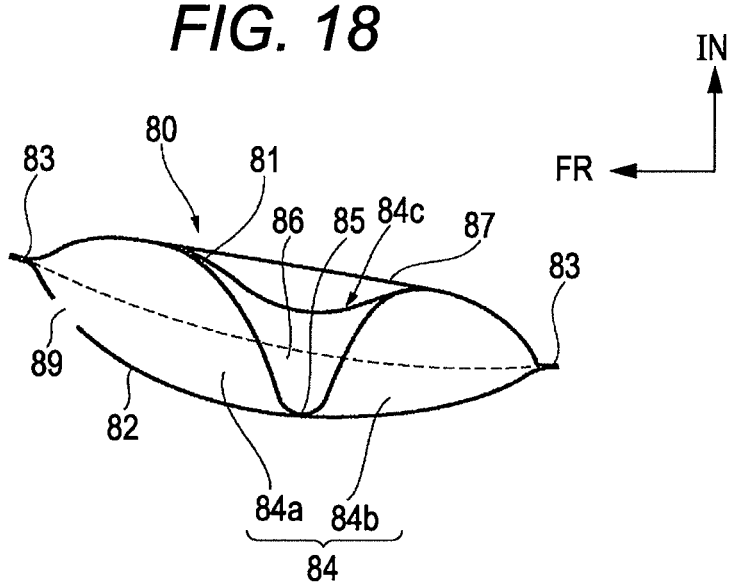
FIG. 18 is a schematic sectional view taken along a line II-II' in FIG. 16.

As illustrated in FIGS. 16 to 18, in the side air bag member 80 according to the present embodiment, a part of an interior panel 81 is formed like an umbrella. Specifically, a recess is formed on the interior panel 81 and an exterior panel 82.

The outer periphery of the interior panel 81 and the exterior panel 82, which are formed with the recess, is sealed by a sealing portion 83, whereby the side air bag member 80 is formed into a bag-like shape. In this case, the sides of the recess are put together to form a recessed portion 86 having an umbrella shape on a part of the interior panel 81 of the side air bag member 80.

The side air bag member 80 is provided with a tether (regulating member) 87 on the interior panel 81. Therefore, the side air bag member 80 expands the first chamber 84a toward the compartment in the widthwise direction of the vehicle during the expansion.

Accordingly, as in the first to fourth embodiments, the occupant protection device in the present embodiment can also prevent the interference between the side air bag member 80 and the curtain air bag member 42.

Consequently, as in the first to fourth embodiments, the occupant protection device according to the present embodiment can secure the appropriate expansion of the curtain air bag member 42 that is expanded together with the side air bag member 80.

Consequently, the occupant protection device provided with the side air bag member 80 and the curtain air bag member 42 can surely secure the appropriate expansion of the side air bag member 80 and the curtain air bag member 42, thereby being capable of enhancing safety to the side impact.

Upon forming the bent portion, the size of the interior panel 81 and the size of the exterior panel 82 are not different from each other in the side air bag member 80 according to the present embodiment, as in the first to fourth embodiments.

Specifically, the side air bag member 80 can use the interior panel 81 and the exterior panel 82 having the same shape, as in the above-mentioned first to fourth embodiments. Thus, the side air bag member 80 can reduce cost.

Sixth Embodiment

Figure 19:
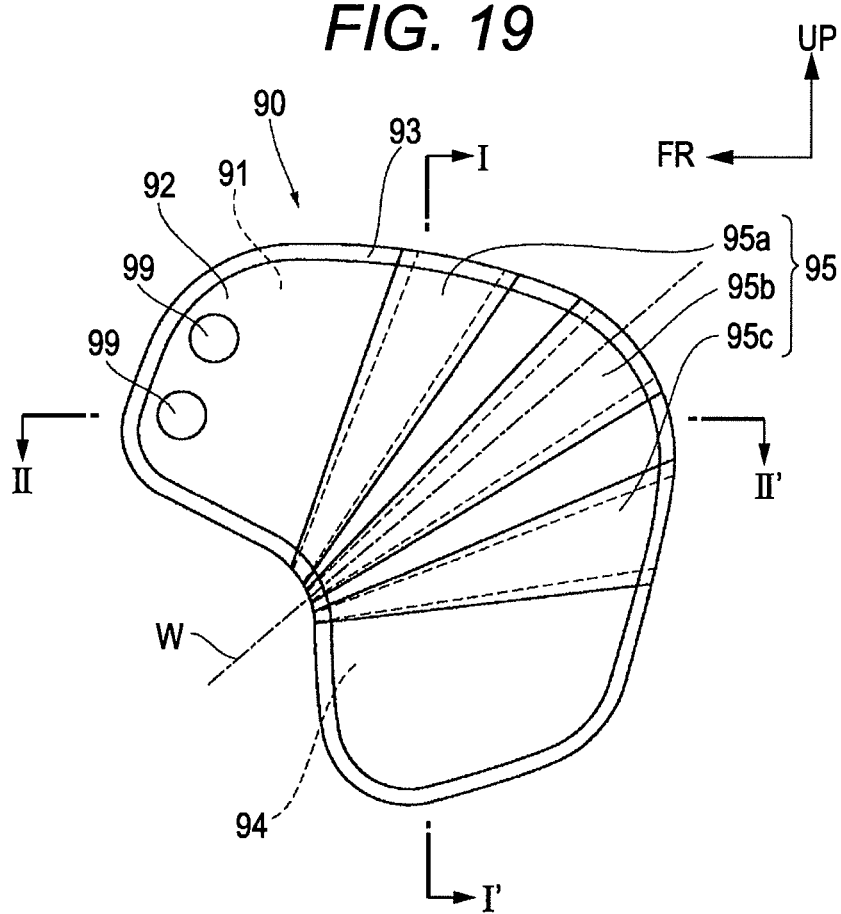
FIG. 19 is a side view schematically illustrating a configuration of a side air bag member, according to another embodiment of the present invention, from aside in a widthwise direction of a vehicle.
Figure 20:
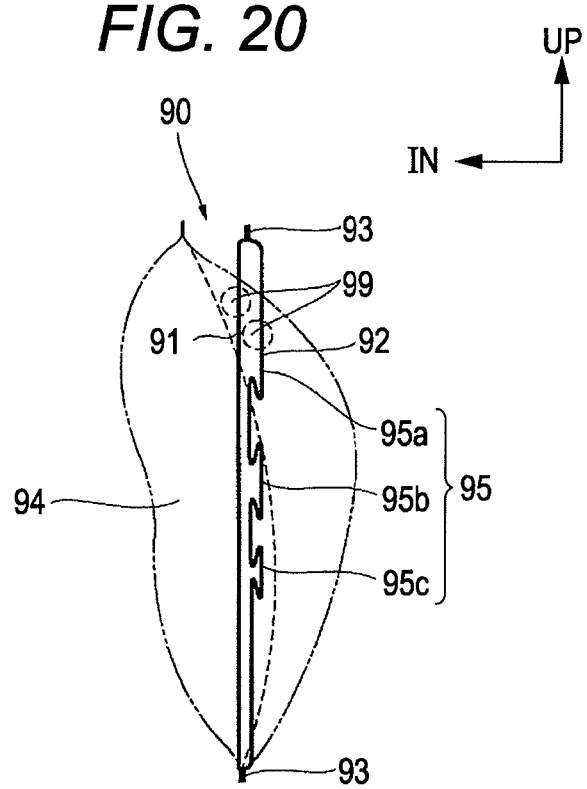
FIG. 20 is a schematic sectional view taken along a line I-I' in FIG. 19.

An occupant protection device according to another embodiment of the present invention will be described with reference to FIGS. 19 to 21. FIG. 19 is a side view schematically illustrating a configuration of a side air bag member 90, according to another embodiment of the present invention, from a side in a widthwise direction of a vehicle; FIG. 20 is a schematic sectional view taken along a line I-I' in FIG. 19; and FIG. 21 is a schematic sectional view taken along a line II-II' in FIG. 19.

The occupant protection device according to the present embodiment is the same as that in the first to fifth embodiments, except that the occupant protection device according to the present invention includes a folded portions 95a, 95b, and 95c for expanding a first chamber 94a toward the compartment in the widthwise direction of the vehicle. Therefore, the components same as those in the first to fifth embodiments are identified by the same numerals, and the description thereof will not be repeated.

Figure 21:
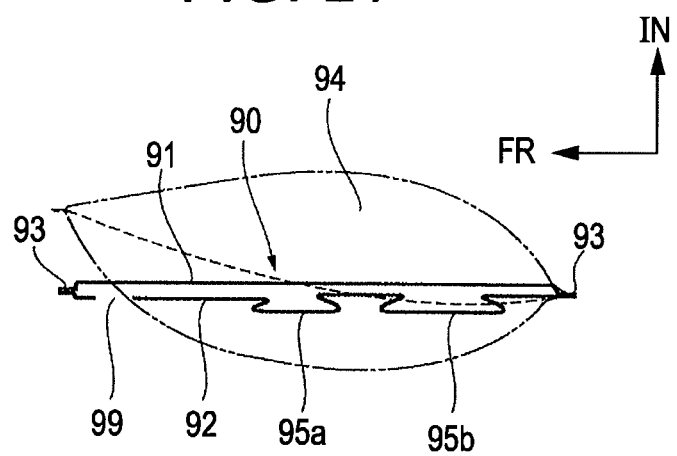
FIG. 21 is a schematic sectional view taken along a line II-II' in FIG. 19.

As illustrated in FIGS. 19 to 21, in the side air bag member 90 according to the present embodiment, an exterior panel 92 is larger than an interior panel 91. When the outer periphery of the exterior panel 92 and the interior panel 91 is sealed by a sealing portion 93, the exterior panel 92 is folded.

Specifically, the exterior panel 92 has plural folded portions 95a, 95b, and 95c. Therefore, the side air bag member 90 is expanded toward the interior panel 91 made of a smaller panel, i.e., toward the compartment in the widthwise direction of the vehicle, during the expansion.

Accordingly, as in the first to fifth embodiments, the occupant protection device in the present embodiment can also prevent the interference between the side air bag member 90 and the curtain air bag member 42.

Consequently, as in the first to fifth embodiments, the occupant protection device according to the present embodiment can secure the appropriate expansion of the curtain air bag member 42 that is expanded together with the side air bag member 90.

Consequently, the occupant protection device provided with the side air bag member 90 and the curtain air bag member 42 can surely secure the appropriate expansion of the side air bag member 90 and the curtain air bag member 42, thereby being capable of enhancing safety to the side impact.

What is claimed is:

1. A side air bag device that expands a side air bag member and a head protective air bag member between a vehicle side wall and a passenger in a widthwise direction of a vehicle so as to protect the passenger from a shock caused by a side impact on the vehicle side wall, wherein the side air bag member includes a bent portion that is bent in a self-induced manner for expanding the side air bag member in such a manner that an upper portion of the side air bag member in the vertical direction of the vehicle directs toward a compartment in the widthwise direction of the vehicle as to suppress interference with the head protective air bag member during widthwise direction expansion of the upper portion of said side air bag member, and wherein the upper portion is designed for passenger shoulder or below shoulder protection.

2. The side air bag device according to claim 1, wherein the bent portion includes a non-expanded portion that is formed by bringing a part of an interior panel of the side air bag member located near the compartment in the widthwise direction and a part of an exterior panel of the side air bag member located near the outside of the vehicle into intimate contact with each other so as not to expand during the expansion of the side air bag member, and a regulating member that is arranged on the interior panel for regulating the side air bag member to expand in such a manner that the upper portion of the side air bag member in the vertical direction of the vehicle directs toward the compartment in the widthwise direction of the vehicle from the non-expanded portion.

3. The side air bag device of claim 2 wherein the regulating member is secured to the interior panel at an intermediate region of the upper portion of the side air bag member.

4. The side air bag device according to claim 1, wherein the bent portion is formed of a knob portion that is formed by pinching the interior panel of the side air bag member located near the compartment in the widthwise direction of the vehicle.

5. The side air bag device according to claim 1, wherein the side air bag member includes an interior panel and an exterior panel relative to the widthwise direction of the vehicle, and wherein the bent portion is formed by providing a regulating member on the interior panel of the side air bag member located near the compartment in the widthwise direction of the vehicle.

6. The side air bag device according to claim 1, wherein the bent portion is configured by forming a recessed portion having a shape of an umbrella on an interior panel of the side air bag member located near the compartment in the widthwise direction of the vehicle.

7. The side air bag device according to claim 1, wherein the side air bag member includes an interior panel and an exterior panel relative to the widthwise direction of the vehicle, and wherein the bent portion is configured to include a folded portion on the exterior panel having an area larger than that of the interior panel.

8. The side air bag device according to claim 1, wherein the side air bag member includes a vent hole that is open toward the front in the longitudinal direction of the vehicle during the expansion.

9. The side air bag device according to claim 8, wherein the vent hole is formed at the front part in the longitudinal direction of the vehicle from the bent portion of the side air bag member.

10. The side air bag device according to claim 9, wherein the vent hole is formed on a front end of the side air bag member in the longitudinal direction of the vehicle.

11. The side air bag device according to claim 8, wherein the vent hole is formed on a front end of the side air bag member in the longitudinal direction of the vehicle.

12. The side air bag device of claim 1 wherein an upper, interior most portion of the side air bag member is designed for chest protection.

13. The side air bag device of claim 1 wherein the bent portion is positioned below a belt line of the vehicle.

14. The side air bag device of claim 1 wherein the side air bag member is free of a head protective portion and the head protective air bag member is configured to expand below a belt line of the vehicle.

15. The side air bag device of claim 1 wherein said side air bag member is formed of an interior side panel and an exterior side panel which are configured to be interchangeable.

16. A side air bag device that expands a side air bag member between a vehicle side wall and a passenger in a widthwise direction of a vehicle so as to protect the passenger from a shock caused by a side impact on the vehicle side wall,
wherein the side air bag member includes a bent portion that can expand the side air bag member in such a manner that an upper portion of the side air bag member in the vertical direction of the vehicle directs toward a compartment in the widthwise direction of the vehicle, wherein the upper portion is designed for passenger shoulder or below shoulder protection, and wherein the bent portion includes a first shift portion that is arranged on the interior panel of the side air bag member located near the compartment in the widthwise direction of the vehicle, and that is formed by shifting the interior panel downward in the vertical direction of the vehicle, and a second shift portion arranged on the exterior panel of the side air bag member located near the outside of the vehicle in the widthwise direction, and that is formed by shifting the exterior panel upward in the vertical direction of the vehicle.

17. An occupant protection device that allows a side air bag member and a head protective air bag member to expand between a vehicle side wall and a passenger in a widthwise direction of a vehicle so as to protect the passenger from a shock caused by a side impact on the vehicle side wall,
wherein the side air bag member, which is free of a head protective portion, includes a bent portion that is bent in a self-induced manner for expanding the side air bag member in such a manner that an upper portion of the side air bag member in the vertical direction of the vehicle suppresses interference with the head protective air bag member during expansion of the head protective air bag member vertically below the upper portion of the side air bag member.

18. The occupant protection device of claim 17 wherein an upper, interior most portion of the side air bag member, relative to the widthwise direction of the vehicle, is configured to contact a shoulder or chest portion of the passenger.

19. An occupant protection method that comprises deploying a side air bag member and a head protective air bag member to expand between a vehicle side wall and a passenger in a widthwise direction of a vehicle so as to protect the passenger from a shock caused by a side impact on the vehicle side wall,
wherein the side air bag member, which is free of a head protective portion, includes a bent portion that, during the deployment, is bent in a self-induced manner for expanding the side air bag member such that an upper portion of the side air bag member in the vertical direction of the vehicle suppresses interference with the head protective air bag member during expansion of the head protective air bag member vertically below the upper portion of the side air bag member.

20. The occupant protection method of claim 19 wherein the expansion of the side air bag member and head protective bag member is carried out such that an upper, interior most portion of the side air bag member, relative to the widthwise direction of the vehicle, is configured to contact a shoulder or chest portion of the passenger.

* * * * *